(12) United States Patent
Marchlewski et al.

(10) Patent No.: US 9,783,245 B1
(45) Date of Patent: Oct. 10, 2017

(54) CROSS-MEMBER FOR PICKUP TRUCK BOX

(71) Applicant: Ford Global Technologies, LLC, Dearborn, MI (US)

(72) Inventors: Jack Marchlewski, Saline, MI (US); Robert Reiners, Grosse Ile, MI (US); Dragan B. Stojkovic, Taylor, MI (US); Joshua R. Hemphill, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/337,421

(22) Filed: Oct. 28, 2016

(51) Int. Cl.
*B62D 33/00* (2006.01)
*B62D 33/02* (2006.01)
*B62D 21/02* (2006.01)
*B62D 21/03* (2006.01)
*B62D 29/00* (2006.01)
*B62D 65/02* (2006.01)
*B62D 27/02* (2006.01)
*B62D 27/06* (2006.01)

(52) U.S. Cl.
CPC ............. *B62D 33/02* (2013.01); *B62D 21/02* (2013.01); *B62D 21/03* (2013.01); *B62D 27/026* (2013.01); *B62D 27/065* (2013.01); *B62D 29/008* (2013.01); *B62D 65/02* (2013.01); *B60Y 2200/141* (2013.01)

(58) Field of Classification Search
CPC .... B62D 33/02; B62D 25/2054; B62D 21/02; B62D 21/03; B62D 27/026; B62D 27/065; B62D 29/008; B62D 65/02

USPC .............. 296/183.1, 184.1, 193.07, 204, 205
See application file for complete search history.

(56) References Cited

U.S. PATENT DOCUMENTS

| | | | | |
|---|---|---|---|---|
| 3,097,877 | A * | 7/1963 | Erlandsen | B62D 33/04 296/182.1 |
| 3,705,732 | A * | 12/1972 | Marinelli | B62D 25/2054 280/423.1 |
| 6,558,765 | B2 * | 5/2003 | Padmanabhan | B32B 21/08 156/325 |
| 7,731,271 | B2 | 6/2010 | Shelbo et al. | |
| 8,672,390 | B1 * | 3/2014 | Pfaff | B62D 35/001 180/903 |
| 2003/0001409 | A1 * | 1/2003 | Semple | B62D 33/02 296/183.1 |
| 2008/0277971 | A1 * | 11/2008 | Sato | B62D 21/03 296/203.04 |

(Continued)

*Primary Examiner* — Joseph D Pape
(74) *Attorney, Agent, or Firm* — Jason Rogers; Brooks Kushman P.C.

(57) ABSTRACT

A pickup truck box assembly includes a pair of longitudinal frame rails, an extruded cross-member, and a truck bed. The cross-member has a uniform longitudinal cross-section assembled perpendicular to the rails and defines a rectilinear profile with a front flange extending from a cross-member upper portion on a front side and a rear flange extending from the upper portion on a rear side. The truck bed is secured on top of the flanges and the cross-member upper portion. The cross-member may include a first end adjacent a first wheel well defined by the truck bed and a second end adjacent a second wheel well defined by the truck bed such that the cross-member spans between the wheel wells. The ends may be spaced from their respective wheel wells a distance selected to provide space for a truck box inner panel.

18 Claims, 4 Drawing Sheets

(56) References Cited

U.S. PATENT DOCUMENTS

2011/0298245 A1 12/2011 Jarocki et al.
2013/0300087 A1* 11/2013 Hausler ................ B60D 1/015
  280/496

* cited by examiner

CROSS-MEMBER FOR PICKUP TRUCK BOX

TECHNICAL FIELD

This disclosure relates to assemblies for supporting pickup truck boxes and components thereof.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly from the bed. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo and towing various types of trailers.

Stamped pickup truck box components may often be made from steel sheet metal. The components may form assemblies of multiple parts including multiple assembly steps. Corners of the box also include an A-surface that has certain fit and finish requirements that may not be compromised by reinforcements that result in deformation or other surface imperfections.

This disclosure is directed to solving the above problems and other problems as summarized below.

SUMMARY

According to an aspect of the present disclosure, a pickup truck box assembly includes a pair of longitudinal frame rails, an extruded cross-member, and a truck bed. The cross-member has a uniform longitudinal cross-section assembled perpendicular to the rails and defines a rectilinear profile with a front flange extending from a cross-member upper portion on a front side and a rear flange extending from the upper portion on a rear side. The truck bed is secured on top of the flanges and the cross-member upper portion. The cross-member may include a first end adjacent a first wheel well defined by the truck bed and a second end adjacent a second wheel well defined by the truck bed such that the cross-member spans between the wheel wells. The ends may be spaced from their respective wheel wells a distance selected to provide space for a truck box inner panel. The cross-member may further define an upper surface sized for applying an adhesive thereto for securing the truck bed to the upper surface. The cross-member may define a first fastener hole and a second fastener hole and the cross-member may be arranged with the truck bed such that a bed hole of the truck bed is in registration with the first fastener hole and the second fastener hole to receive a fastener to facilitate securing the truck bed to the cross-member. The cross-member may further define first and second lower flanges extending from a lower portion of the cross-member. A lower portion of the cross-member may define a first surface area. The front flange, the rear flange, and the upper portion may define a second surface area greater than the first surface area.

According to another aspect of the present disclosure, a pickup truck box assembly includes a pair of frame rails, a cross-member, and a truck bed. The cross-member is mounted to the pair of rails and has an upper wall with a top surface having a surface area $S_1$ and a lower wall with a bottom surface having a surface area $S_2$ that is less than half of $S_1$. The first and seconds spaced walls form a box channel with the upper and lower walls. The truck bed is mounted to the top surface. $S_1$ may further be defined by a pair of opposing upper flanges extending from an upper central portion of the cross-member. The cross-member may further include an upper hole in the top surface and a lower hole in the lower surface. The upper hole and the lower hole may be in substantial registration with a bed hole of the truck bed for receiving a fastener to secure the cross-member to the truck bed. $S_2$ may further be defined by a pair of opposing lower flanges extending from a lower central portion of the cross-member. The truck bed may define first and second wheel wells. The cross-member may be arranged with the truck bed such that a first cross-member end is adjacent one of the wheel wells and a second cross-member end is adjacent another of the wheel wells. The cross-member may be extruded as a single component. A vertical wall portion of the cross-member may have a thickness greater than a thickness of other portions of the cross-member to provide bolt clamp load strength.

According to a further aspect of the present disclosure, a support cross-member for a pickup truck box includes a lower portion and an upper portion. The lower portion has a bottom surface with a first surface area. The upper portion has an adhesive receiving surface with a second surface area greater than the first surface area. The lower portion and the upper portion define aligned fastener receiving holes between a pair of vertical walls extending between the lower portion and the upper portion. A pair of opposing upper flanges may each extend from a central area of the upper portion. A pair of opposing lower flanges may each extend from a central area of the lower portion. A top wall may further define the upper portion. A bottom wall may further define the lower portion. Two vertical walls may extend between the bottom wall and top wall. The walls may be arranged with one another to define a rectilinear box channel. The top wall may be wider in a longitudinal direction than the bottom wall. The cross-member may be sized to extend between first and second wheel wells of a truck bed of the pickup truck box. A vertical wall portion of the cross-member may have a thickness greater than a thickness of other portions of the cross-member to provide bolt clamp load strength.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
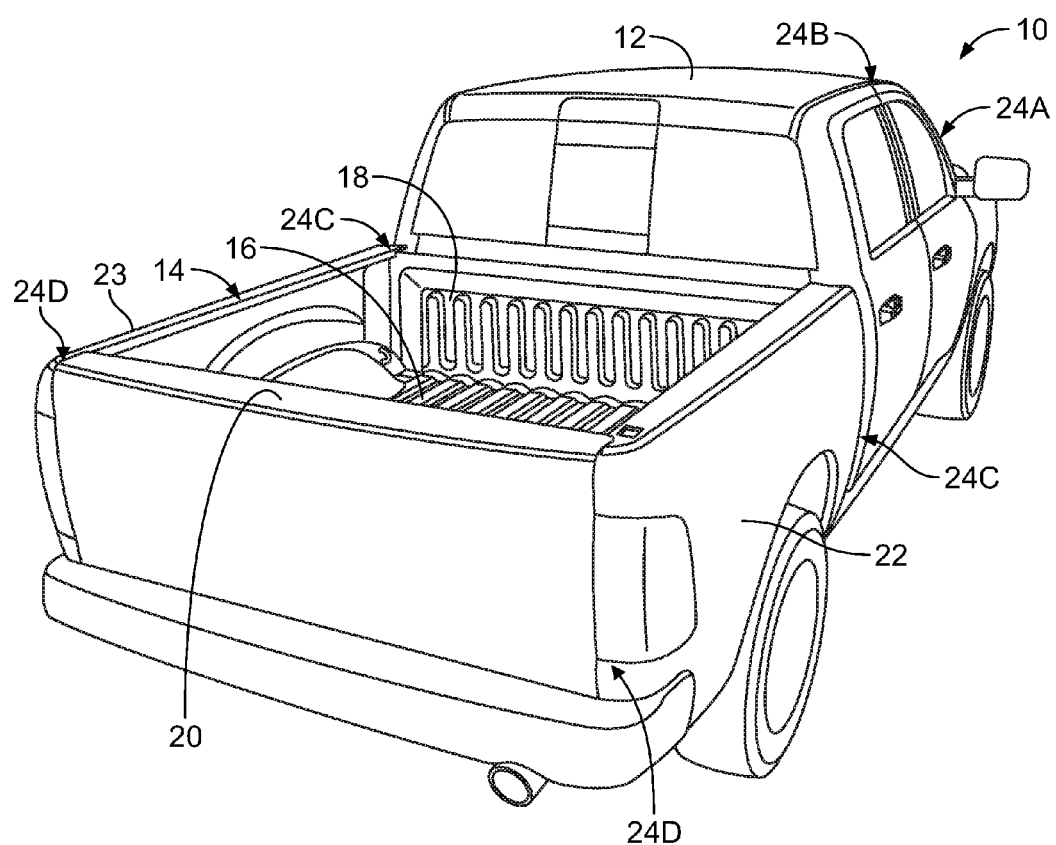
FIG. 1 is a rear perspective view of an example of a portion of a pickup truck.

Referring to FIG. 1, an example of a vehicle 10 is illustrated that includes a cabin 12 and a truck box 14 supported by a vehicle chassis (not shown). The vehicle 10 may be, for example, a pickup truck comprising a majority of aluminum components. The truck box 14 includes a bed 16 having a forward end adjacent to the cabin 12 and a rear end opposite the forward end. The bed 16 supports a header 18 at the forward end and a tailgate 20 at the rear end. The tailgate 20 is pivotally mounted to the bed 16. The bed 16 also supports a first body side panel 22 and a second body side panel 23. In this example, the vehicle 10 includes an A-pillar region 24a, a B-pillar region 24b, a C-pillar region 24c, and a D-pillar region 24d. The illustrated vehicle 10 is a four door configuration, however other configurations, such as a two door configuration, may be adopted to incorporate the disclosed concepts. Alternate configurations may include different pillar region references than the vehicle 10.

The first body side panel 22 and second body side panel 23 are secured to the header 18 at respective regions referred to as forward box pillar regions of the truck box 14 or the C-pillar regions 24c herein. The tailgate 20 pivots between an open position and a closed position. In the closed position as shown in FIG. 1, each lateral end of the tailgate 20 may be removably attached to the first body side panel 22 and the second body side panel 23 at respective regions referred to as rear box pillar regions or the D-pillar regions 24d herein.

Figure 2:
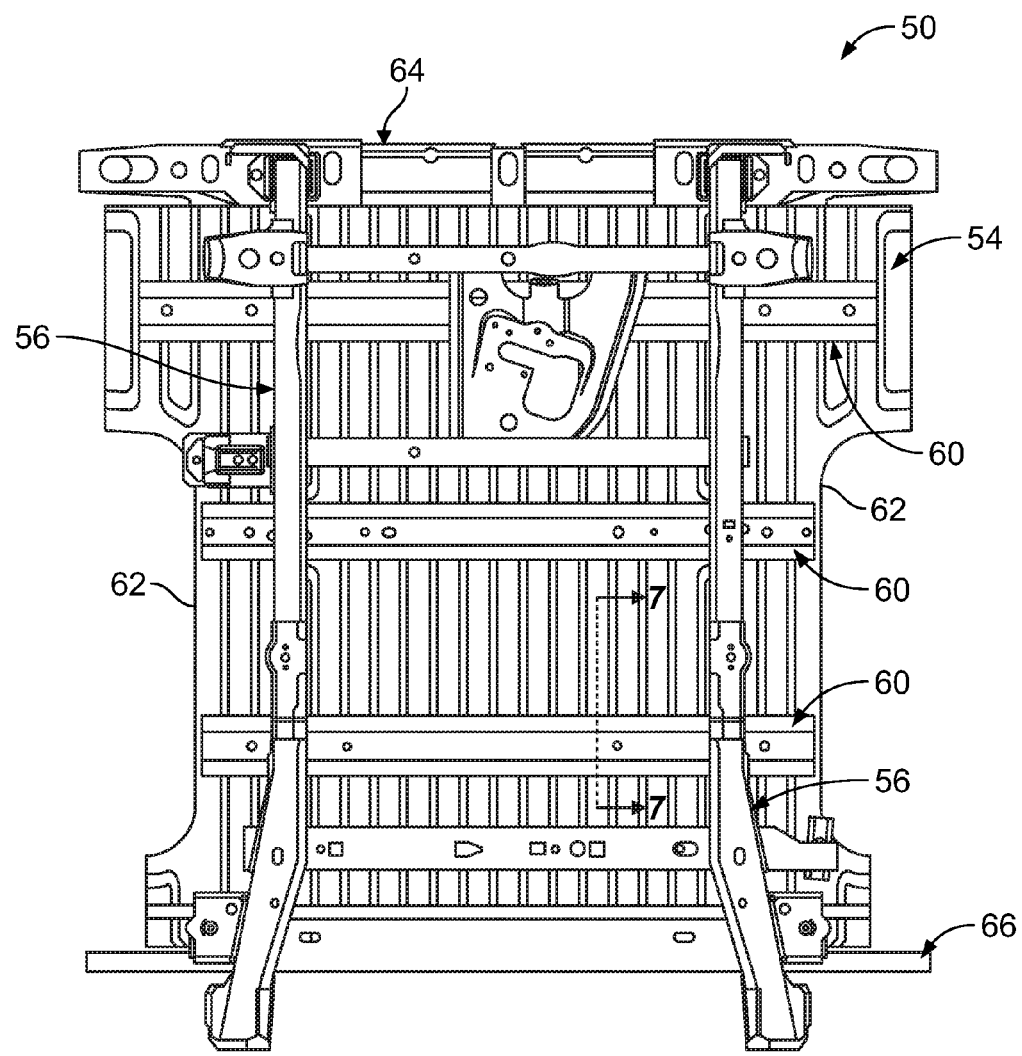
FIG. 2 is a bottom view of an example of a portion of a pickup truck bed assembly.

FIG. 2 illustrates one example of a portion of a pickup truck bed assembly that is generally referred to as a truck bed assembly 50 herein. The truck bed assembly 50 includes a truck bed 54, a pair of longitudinal frame rails 56, and one or more cross-members 60. The truck bed 54 may define a pair of wheel wells 62. The truck bed 54 is disposed between a tailgate region 64 and a header region 66. The pair of frame rails 56 is part of a vehicle chassis. Each of the cross-members 60 are sized for securing to the truck bed 54 and the frame rails 56 and include an enlarged surface area for supporting the truck bed 54 in comparison to prior art cross-members.

Figure 3:
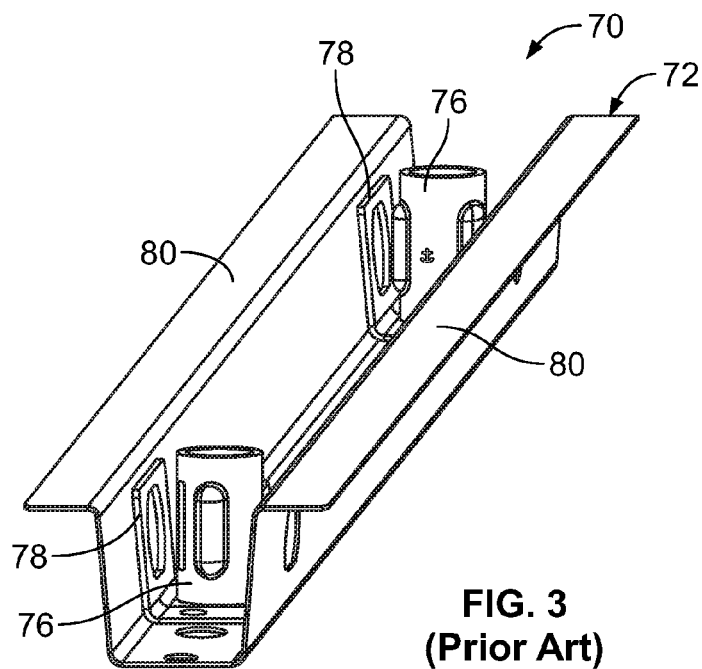
FIG. 3 is an example of a prior art cross-member of a pickup truck bed assembly.

FIG. 3 illustrates one example of a prior art cross-member assembly, referred to as a cross-member assembly 70 herein. The cross-member assembly 70 includes a cross-member 72, a pair of crush tubes 76, and a pair of reinforcements 78. The cross-member 72 is a stamped component having a U-shaped profile and including a pair of upper flanges. The upper flanges 80 support a truck bed thereupon. The upper flanges 80 are spaced from one another and are not connected with one another to define a planar, continuous surface for mounting the truck bed.

Figure 4:
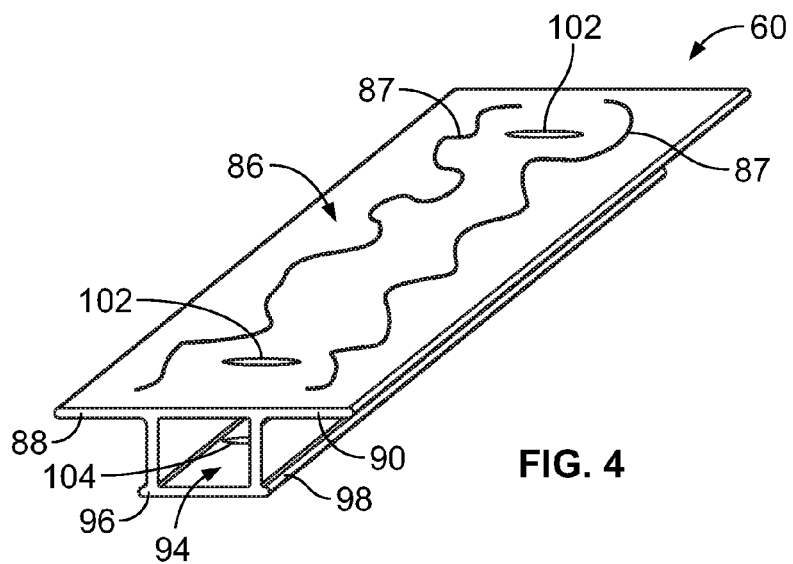
FIG. 4 is a perspective view of an example of a cross-member of the pickup truck bed assembly of FIG. 2.
Figure 5:
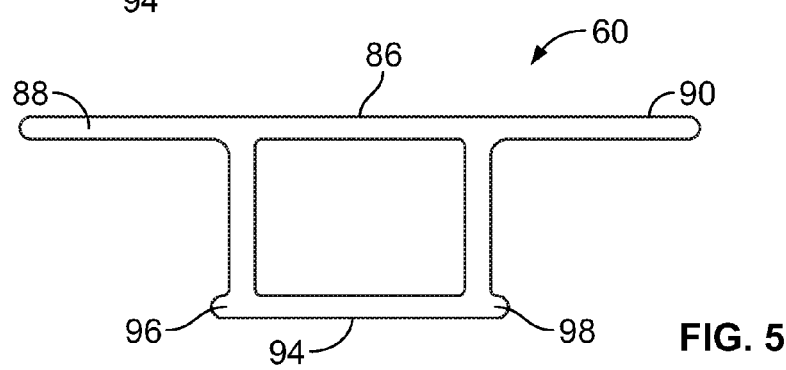
FIG. 5 is a side view of the example of the cross-member of FIG. 4.

FIGS. 4 and 5 show further detail of one of the cross-members 60. In contrast to the cross-member 72, the cross-member 60 defines a continuous planar upper surface 86. In one example, the upper surface 86 may define a width between 70 mm and 90 mm. The width of the upper surface 86 is sufficient to apply a substantial quantity of adhesive 87 for securing the truck bed 54 to the cross-member 60. The adhesive 87 may be a thermal curing adhesive. In one example, the upper surface 86 may define a length between 1250 mm and 1500 mm.

One of the cross-members 60 may include a first end adjacent one of the wheel wells 62 and a second end adjacent the other of the wheel wells 62. Each of the first and second ends may be spaced from the wheel well 62 to provide spacing for a panel of the pickup truck box. As another example, one of the cross-members 60 may define a length less than a length between the opposing wheel wells 62. As yet another example, one of the cross-members 60 may define a length greater than a distance between the wheel wells 62 and be located adjacent the tailgate region 64.

The upper surface 86 is defined by a first upper flange 88 and a second upper flange 90, each extending from a central region of the upper surface 86. For example, the upper surface 86 is continuous as shown in FIG. 4 in contrast to the cross-member 72 having two separate upper flanges 80. A profile of the cross-member 60 may include a square-shaped portion with each of the first upper flange 88 and the second upper flange 90 extending therefrom. Lower flanges of the cross-member 60 are another difference between the cross-member 72 and the cross-member 60. The cross-member 60 includes a lower surface 94 having a first lower flange 96 and a second lower flange 98. The first lower flange 96 and the second lower flange 98 each extend from a central portion of the lower surface 94. The inclusion of the first lower flange 96 and the second lower flange 98 provide additional space for mounting the cross-member 60 to the frame rails 56 in comparison to the cross-member 72. A surface area of the lower surface 94 may be less than a surface area of the upper surface 86. For example, the lower surface 94 may have a surface area less than half of the surface area of the upper surface 86.

Each of the cross-members 60 may be made of a type of aluminum or aluminum alloy. For example, aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminum alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties). Each of the cross-members 60 may be of, for example, 6061-TG or 6082-T6 aluminum alloy. It is contemplated that each of the cross-members 60 may be of a different series aluminum. Each of the cross-members 60 may define a rectilinear box channel.

Each of the cross-members 60 may be formed via an extrusion process. For example, extrusion is a process to create components of a fixed or uniform cross-sectional profile. A material blank is pushed through a die of a desired cross-section after being heated. A ram of a press pushes the material blank toward and through the die. Previous cross-member components are typically stamped which may require additional reinforcement components in assemblies such as the cross-member assembly 70. In comparison, extruded cross-member components provide an option to have varied component thicknesses at various portions of the extruded cross-member components such as the cross-member 60. For example, an increased material thickness may be located at vertical walls of the cross-member 60 to provide bolt clamp load strength. Further, extrusion processes are typically less complex than stamping processes and produce components with improved finishes in comparison to stamped components.

Figure 6:
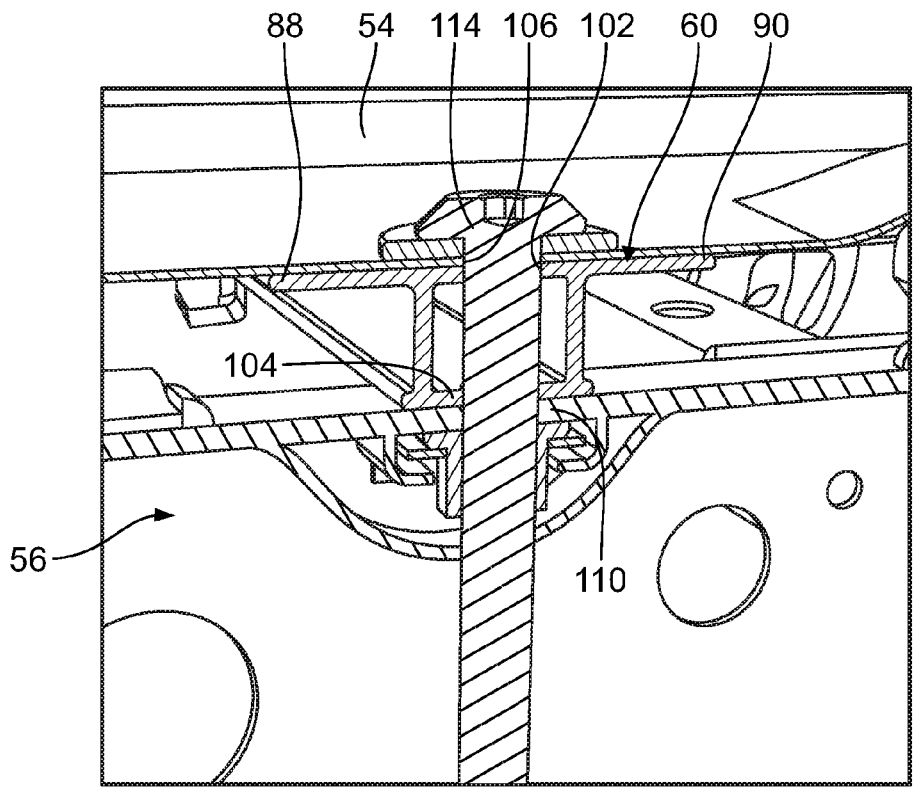
FIG. 6 is a fragmentary perspective view, in partial cross-section, of a portion of the pickup truck bed assembly of FIG. 2.
Figure 7:
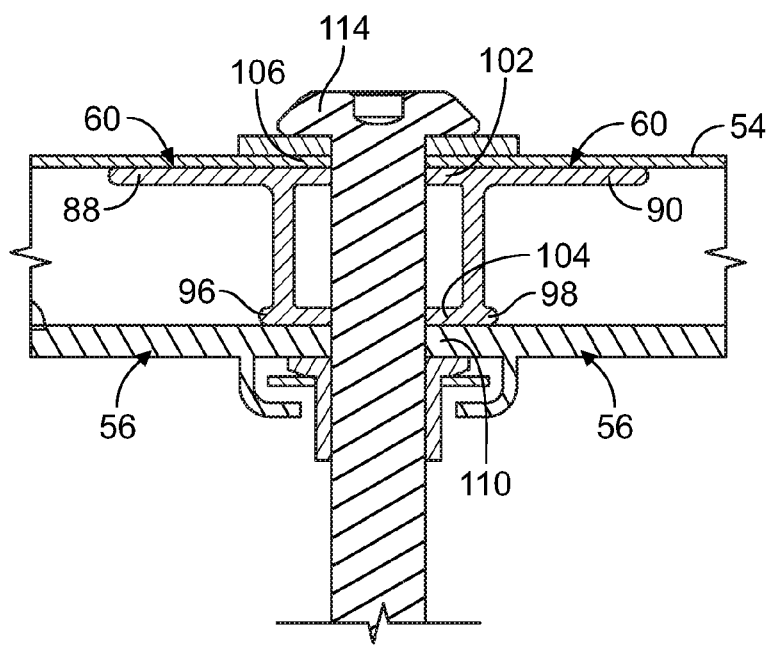
FIG. 7 is a fragmentary side view, in cross-section, of a portion of the pickup truck bed assembly of FIG. 2.

FIGS. 6 and 7 show a cross-section of a portion of an assembly of the truck bed 54, one of the frame rails 56, and the cross-member 60. The cross-member 60 includes pair of upper fastener holes 102 and a pair of lower fastener holes 104 (shown in FIG. 4). The truck bed 54 includes one or more bed holes 106. Each of the frame rails 56 includes one or more rail holes 110. The truck bed 54, one of the frame rails 56, and the cross-member 60 may be arranged with one another such that one of the upper fastener holes 102, one of the lower fastener holes 104, one of the bed holes 106, and one of the rail holes 110 are in substantial registration with one another. For example, the holes may be aligned to receive a fastener 114 to secure the truck bed 54, the frame rail 56, and the cross-member 60 to one another. The fastener 114 may be, for example, a bolt, screw, or similar fastener. Further, the cross-member 60 does not include a crush tube or reinforcement member in contrast to the cross-member assembly 70.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pickup truck box assembly comprising:
a pair of longitudinal frame rails;
an extruded cross-member having a uniform longitudinal cross-section assembled perpendicular to the rails and defining a rectilinear profile with a first flange extending from a cross-member upper portion on a front side and a second flange extending from the upper portion on a rear side; and
a truck bed secured on top of the flanges and the cross-member upper portion,
wherein an upper portion of the cross-member defines a first fastener hole and a lower portion of the cross-member defines a second fastener hole, and wherein the cross-member is arranged with the truck bed such that a bed hole of the truck bed is in registration with the first fastener hole and the second fastener hole to receive a fastener to facilitate securing the truck bed to the cross-member.

2. The assembly of claim 1, wherein the cross-member includes a first end adjacent a first wheel well defined by the truck bed, and a second end adjacent a second wheel well defined by the truck bed such that the cross-member spans between the wheel wells.

3. The assembly of claim 2, wherein the ends are spaced from their respective wheel wells a distance selected to provide space for a truck box inner panel.

4. The assembly of claim 1, wherein the cross-member further defines an upper surface sized for applying an adhesive thereto for securing the truck bed to the upper surface.

5. The assembly of claim 1, wherein the cross-member further defines first and second lower flanges extending from a lower portion of the cross-member.

6. The assembly of claim 1, wherein a lower portion of the cross-member defines a first surface area, and wherein the first flange, the second flange, and the upper portion define a second surface area greater than the first surface area.

7. A pickup truck box assembly comprising:
a pair of frame rails;
a cross-member mounted to the rails and having an upper wall with a top surface having a surface area $S_1$ and a lower wall with a bottom surface having a surface area $S_2$ less than half of $S_1$, and first and second spaced walls forming a box channel with the upper and lower walls; and
a truck bed mounted to the top surface.

8. The assembly of claim 7, wherein $S_1$ is further defined by a pair of opposing upper flanges extending from an upper central portion of the cross-member.

9. The assembly of claim 7, wherein the cross-member further includes an upper hole in the top surface and a lower hole in the bottom surface, wherein the truck bed includes a bed hole, and wherein the upper hole and the lower hole are in substantial registration with the bed hole for receiving a fastener to secure the cross-member to the truck bed.

10. The assembly of claim 7, wherein $S_2$ is further defined by a pair of opposing lower flanges extending from a lower central portion of the cross-member.

11. The assembly of claim 7, wherein the truck bed defines first and second wheel wells, and wherein the cross-member is arranged with the truck bed such that a first cross-member end is adjacent one of the wheel wells and a second cross-member end is adjacent another of the wheel wells.

12. The assembly of claim 7, wherein the cross-member is extruded as a single component.

13. The assembly of claim 7, wherein each of the first and second spaced walls has a thickness greater than a thickness of other portions of the cross-member to provide bolt clamp load strength.

14. A truck box support cross-member comprising:
a lower portion having a bottom surface with a first surface area; and
an upper portion having an adhesive receiving surface with a second surface area greater than the first surface area, wherein the lower portion and the upper portion define aligned fastener receiving holes between a pair of vertical walls having a thickness greater than the other portions and extending between the lower portion and the upper portion.

15. The support cross-member of claim 14 further comprising a pair of opposing upper flanges each extending from a central area of the upper portion.

16. The support cross-member of claim 14 further comprising a pair of opposing lower flanges each extending from a central area of the lower portion.

17. The support cross-member of claim 14, further comprising:
   a top wall further defining the upper portion; and
   a bottom wall further defining the lower portion,
   wherein the pair of vertical walls are arranged with one another to define a rectilinear box channel and the top wall is wider in a longitudinal direction than the bottom wall.

18. The support cross-member of claim 14, wherein the cross-member is sized to extend between first and second wheel wells of a truck bed of the truck box.

\* \* \* \* \*